(12) United States Patent
Stewart

(10) Patent No.: US 11,995,614 B2
(45) Date of Patent: May 28, 2024

(54) METHODS, DEVICES, AND SYSTEMS FOR CAPTURING CONTENT FROM CLIENT TRANSACTION RELATED MESSAGES ON A CLIENT DEVICE BY A THIRD PARTY

(71) Applicant: Ambry Hill Technologies, LLC, St. Louis Park, MN (US)

(72) Inventor: Paul Stewart, Rush City, MN (US)

(73) Assignee: Ambry Hills Technologies, LLC, St. Louis Park, MN (US)

( * ) Notice: Subject to any disclaimer, the term of this patent is extended or adjusted under 35 U.S.C. 154(b) by 780 days.

(21) Appl. No.: 16/439,175

(22) Filed: Jun. 12, 2019

(65) Prior Publication Data
US 2020/0394614 A1    Dec. 17, 2020

(51) Int. Cl.
G06F 3/048     (2013.01)
G06F 16/9535   (2019.01)
G06Q 10/107    (2023.01)
G06N 20/00     (2019.01)

(52) U.S. Cl.
CPC ....... G06Q 10/107 (2013.01); G06F 16/9535 (2019.01); *G06N 20/00* (2019.01)

(58) Field of Classification Search
CPC ... G06Q 10/107; G06F 16/9535; G06N 20/00
See application file for complete search history.

(56) References Cited

U.S. PATENT DOCUMENTS

| 7,096,220 B1* | 8/2006 | Seibel | G06F 16/9535 |
| 7,822,679 B1* | 10/2010 | Vaux | G06Q 40/025 |
| | | | 705/38 |
| 10,846,210 B1* | 11/2020 | Singh | G06F 8/71 |
| 2005/0234777 A1* | 10/2005 | Bird | G06Q 30/0621 |
| | | | 705/17 |
| 2012/0166287 A1* | 6/2012 | De Haaff | G06Q 30/0269 |
| | | | 705/14.66 |
| 2013/0290103 A1* | 10/2013 | Paradise | G06Q 30/06 |
| | | | 705/14.58 |
| 2015/0319116 A1* | 11/2015 | Chavali | H04L 51/20 |
| | | | 709/206 |

(Continued)

FOREIGN PATENT DOCUMENTS

| CA | 2579543 A1 * | 8/2007 | G06Q 30/06 |
| WO | WO-2020123464 A1 * | 6/2020 | G06F 21/6218 |

*Primary Examiner* — Rashawn N Tillery
(74) *Attorney, Agent, or Firm* — Brooks, Cameron & Huebsch, PLLC

(57) ABSTRACT

The present disclosure relates to methods, devices, and systems for capturing content from a client's transaction related messages on a client's device by a third party. A transaction data processing system, includes a computing device configured to: harvest data from one or more original messages from an account of a seller within seller's email, wherein the original message has a number of elements arranged in a first order, assemble a modified message for each original message wherein the modified message is a customized, uniform format and where all modified messages each have the same elements in the same orientation, but where the orientation of the elements is different than that of the original message, and route the modified messages to one of more team or individual accounts on the client portal access on the client computing devices at a client network.

20 Claims, 4 Drawing Sheets

(56) References Cited

U.S. PATENT DOCUMENTS

| | | | |
|---|---|---|---|
| 2016/0267533 A1* | 9/2016 | Seth | G06Q 30/0255 |
| 2017/0134326 A1* | 5/2017 | Laporta | H04L 51/30 |
| 2018/0097766 A1* | 4/2018 | Bhagwan | H04L 51/26 |
| 2018/0189359 A1* | 7/2018 | Jenkins | H04L 63/1408 |
| 2018/0239826 A1* | 8/2018 | Epstein | H04L 63/1483 |
| 2018/0349849 A1* | 12/2018 | Jones | G06Q 10/08345 |
| 2020/0151727 A1* | 5/2020 | Butters | G06Q 30/0601 |
| 2020/0211077 A1* | 7/2020 | He | G06V 10/84 |

\* cited by examiner

```
                                                    ┌─ 210
                                                   ↙

┌─────────────────────────────────────────────────────────────────────────┐
│  HARVEST DATA FROM ONE OR MORE ORIGINAL MESSAGES FROM AN ACCOUNT OF A   │
│  SELLER WITHIN SELLER'S EMAIL, WHEREIN THE ORIGINAL MESSAGE HAS A       │
│  NUMBER OF ELEMENTS ARRANGED IN A FIRST ORDER                           │
│                                                                         │
│                                   212                                   │
└─────────────────────────────────────────────────────────────────────────┘

┌─────────────────────────────────────────────────────────────────────────┐
│   ASSEMBLE A MODIFIED MESSAGE FOR EACH ORIGINAL MESSAGE WHEREIN THE     │
│  MODIFIED MESSAGE IS A CUSTOMIZED, UNIFORM FORMAT AND WHERE ALL         │
│  MODIFIED MESSAGES EACH HAVE THE SAME ELEMENTS IN THE SAME              │
│  ORIENTATION, BUT WHERE THE ORIENTATION OF THE ELEMENTS IS DIFFERENT    │
│  THAN THAT OF THE ORIGINAL MESSAGE                                      │
│                                                                         │
│                                   213                                   │
└─────────────────────────────────────────────────────────────────────────┘

┌─────────────────────────────────────────────────────────────────────────┐
│  ROUTE THE MODIFIED MESSAGES TO ONE OF MORE TEAM OR INDIVIDUAL          │
│  ACCOUNTS ON THE CLIENT PORTAL ACCESS ON THE CLIENT COMPUTING DEVICES   │
│  AT A CLIENT NETWORK                                                    │
│                                                                         │
│                                   214                                   │
└─────────────────────────────────────────────────────────────────────────┘
```

FIG. 2

METHODS, DEVICES, AND SYSTEMS FOR CAPTURING CONTENT FROM CLIENT TRANSACTION RELATED MESSAGES ON A CLIENT DEVICE BY A THIRD PARTY

TECHNICAL FIELD

The present disclosure relates to methods, devices, and systems for capturing content from client transaction related messages on a client device by a third party.

BACKGROUND

Businesses often utilize computerized messages, such as emails, to conduct transactions with other parties. For instance, an entity may transact business with other entities directly or via an online marketplace. Online marketplaces can, for example, be utilized for selling industrial parts between sellers that have the parts and buyers needing the parts. In such direct or online marketplace transactions, a buyer may send a message that includes transaction information to the seller (client). For instance, a buyer may send a request for quote that includes information about the item to be purchased, the quantity, and cost, and information about the buyer, shipping information, and payment information, among other data that is useful to the seller (client) in determining whether the transaction should move forward.

Such messages can come from a variety of locations and can be in multiple different formats. This makes collecting and organizing the transaction information contained in the messages tedious. This is especially the case when the information is to be forwarded to another person or a team of people, such as a sales team within the selling business (client). Further, in some instances, it may be desirable to have a third party conduct screening of the potential buyer to ensure the transaction can proceed without issues. Accordingly, the transaction information should be presented to the third party to accomplish this screening but forwarding the messages or extracting the information to a spreadsheet can make the work by the third party difficult.

BRIEF DESCRIPTION OF THE DRAWINGS

FIG. 2 illustrates a method for capturing content from a client's transaction related messages on a client's device by a third party according to one or more embodiments of the present disclosure.

DETAILED DESCRIPTION

Figure 1:
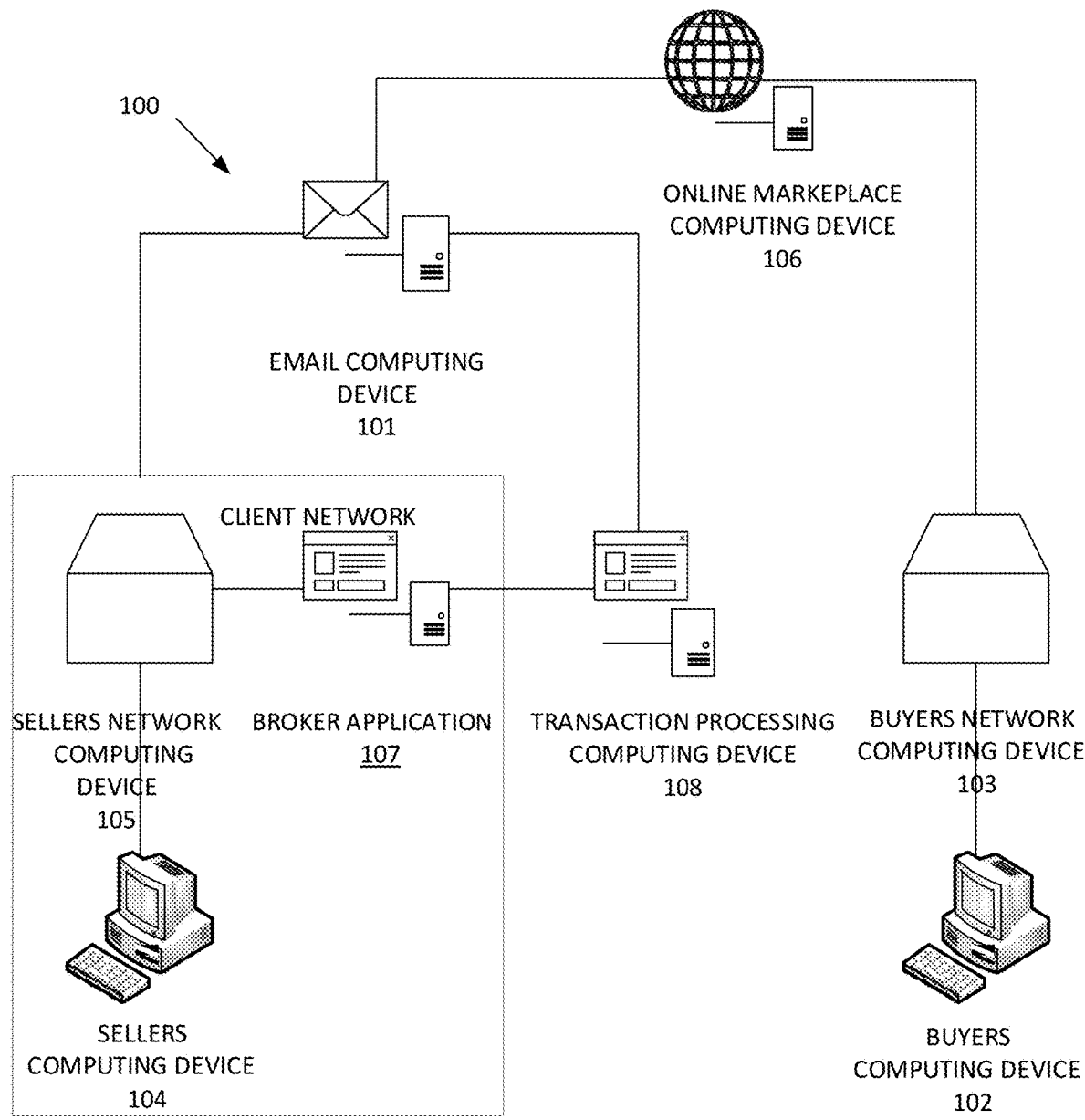
FIG. 1 illustrates a system for capturing content from a client's transaction related messages on a client's device by a third party according to one or more embodiments of the present disclosure.

As discussed above, the embodiments of the present disclosure relate to methods, devices, and systems for capturing content from a client's business related messages on a client's device by a third party. As used herein, business related messages can be any text based message directed either directly or indirectly from one entity to another entity to facilitate a transaction. Business related messages can include text based attachments in any suitable format including, but not limited to PDFs or word processor documents. Such implementations allow a business entity to better process any transaction data it receives regarding a transaction for the sale of an item with another business entity.

Embodiments of the present disclosure provide several functions with respect to handling transaction data. Embodiments harvest transaction data out of messages (e.g., email messages) stored in memory on a client's storage device (on a premises of the client or on a network maintained by or on behalf of the client (e.g., cloud storage or an intermediary acting on behalf of the client). This harvested data can then be provided to a software system that provides connectivity to third party functionalities to, for example, screen the data for export compliance risks, check stock levels, determine routing to individuals or team members, or provide alert functions to alert the client of information that may be pertinent in determining whether/how to move the transaction forward, as will be discussed in more detail below.

Provided below are descriptions of a number of contexts in which the embodiments of the present disclosure are utilized. These are presented as mere examples and should not be viewed as limiting the claims unless such elements are specifically claimed.

In a first example, aircraft parts are sold through a number of unique online marketplace systems that allow sellers (client) to post parts available and buyers to locate and offer to buy the parts from the seller (client). These systems include more than a dozen marketplaces throughout the world.

In these online marketplace systems, the sellers (a client of a system embodiment of the present disclosure), via a computing device (e.g., web portal), can list their inventory of parts and the buyers, via a computing device (e.g., web portal), can enter the online marketplace hosted on one or more computing devices of the marketplace provider, search the inventory of all sellers parts or those of one or more particular sellers, and initiate a request for quote to the seller (client) of the inventory they are interested in. In some of these marketplaces, it is common that during set up, the seller (client) sets up one delivery location for all requests. This is desirable so that no requests for quote are erroneously overlooked but can be hard to manage in some instances.

In current implementations, the seller's (client) representative reviews the received requests for quote on a display of a computing device and routes them through the seller's local computing network to one or more of the computing devices of the seller's sales team so the requests for quote can be vetted to meet certain criteria. If the criteria for a sale are met, the seller team member prepares a quote to send to the particular buyer associated with the request for quote and sends the quote back to the buyer to get their acceptance to buy the item.

In contrast, in embodiments of the present disclosure, the messages are received and stored in the seller's (client) computing device. A harvesting application from outside the seller's network accesses the messages (the seller (client) has allowed access to their messages). The harvesting application includes software to determine whether the message is of a known transaction message format (each sender may have a different format for their message text). If the format of the text of the message is known, then the harvesting application identifies and extracts transaction data within the message that encompasses the basic information of the transaction. Based on the data captured, a number of functionalities can be provided that use the captured data to provide the functions, as will be discussed in more detail below.

The broker application is a software tool the resides on the seller's computing device within the local seller (client) network system. The broker tool interacts with an enterprise resource planning (ERP) software application that contains information about the seller's business transaction data. The ERP application can be resident on the seller's computing device or on another device within the local network. It acts as a connection point between the seller's (client) ERP data and the system holding the data harvested from the Request for Quote messages in memory of the transaction processor system.

The ERP is a management tool that can be used to manage a variety of functions for a company (enterprise). In this manner, the ERP can facilitate and manage the process for the management of and/or the evaluation of requests for quotes and/or the creation of quotes in response to requests for quote sent by buyers. The ERP application can also be used to save information about the request and/or resulting created quote, among other functions. Through use of the information provided by the ERP, the sales team can prepare an appropriate quote.

The embodiments of the present disclosure can, for example, enable a provider of the software service or a transaction processor to harvest data from the request for quote messages from a seller's computing device; reassemble each request for quote in a customized, manageable, universal format; and route the reassembled requests for quote to teams or individuals at a client (e.g., seller) of the transaction processor system. When utilized by a transaction processor, embodiments of the present disclosure can, for example, allow the transaction processor to present transactions from multiple marketplaces in one aggregated listing based on the ability to put the transactions in a universal format.

Further, as indicated above, in some embodiments, the universal format can be customized by the seller so that the information is presented in a manner that includes the seller's preferences on the content of information presented and the arrangement of the presentation of the content. Such flexibility can make the processing of these transactions happen more quickly and make specific information within the system easier to locate among other benefits.

In some embodiments, the transaction processing system can be used to create customized rules that are of use to the client. For example, a customized alert may be for a request by a key account or a particular part number that is of interest to the client in a request for quote. Or, for example, a customized route may be for assigning a request for quote to specific individual or team of individuals automatically based on criteria defined by the client.

Embodiments of the present disclosure include functionalities that are provided through a client (seller) access portal of the transaction processor and a broker application that is provided to the client that allows customizable interaction between the client and the client access portal such that the transaction processor can use selections stored in the broker (in memory) to shape how the information coming from their ERP software is presented and/or handled for the client.

In addition to controlling some aspects of the workflow of determining whether to create a quote and of creating the quotes, embodiments also include management tools that allow managers for a client to see requests for quote that are assigned to members of their team. Such functionality can also, for example, allow a manager to see what the team member quoted in response to requests, historical quote information, and what requests were ignored, among other functions available to the manager.

In order to facilitate such functionality, a software tool (broker application) is installed on a computing device of the client's local network that allows the transaction processor to access the client's ERP database and customize how transaction elements are presented to the client on the transaction processor client access portal online, insert data that they create through the transaction processing system back into the client's ERP system or read data from the client ERP database to be presented back to the client through the client access portal. One advantage of embodiments of the present disclosure is that the software tool can be utilized with any ERP system, allowing it to read or write transaction data to or from the client's ERP system.

This is particularly useful for systems that can be connected to with open database connectivity (ODBC) and accept SQL statements which can be used with the embodiments of the present disclosure.

Embodiments of the present disclosure provide a number of advantages. For example, currently, each marketplace sends their requests for proposal to the seller's message box in a different format. In embodiments of the present disclosure, because this information is being captured and the data is being standardized into a uniform format, clients can take requests for quote from a single sender (buyer) across multiple listing services and combine them into one quote to create a single.

Currently, these requests for quote would each need to be responded to in separate responses from the client adding a lot of traffic to the system. This can also be beneficial as sellers (client) may not bother to respond to small orders (e.g., one order of rivets), but may respond to an order that is a larger aggregated order, that consists of many small orders that individually would have been ignored (e.g., several orders of rivets, washers, and nuts).

The seller (client) can also choose how to respond to the buyer with their quote. For example, the client can communicate through the marketplace listing service, can send a message via email to the buyer, or the seller (client) can use the transaction processing system to send the quote.

Embodiments of the present disclosure can also include functionality to restrict those parties that a seller (client) may not legally sell items to, for example, those with terrorist ties, those that are in countries under sanctions, the part is export controlled for some reason, etc. This, for example, can be accomplished by a list of buyers that are blocked that can be updated periodically. Such a list can be a global list that applies to all clients of the system or can be an individual list that applies only to one client or a group of clients (e.g., aviation clients in the United States). Entries to the list can be provided by the administrator of the system and/or the client(s). One example of a client entry to be blocked would be a competitor that is submitting requests for quote.

These blocked buyer's requests for quote can then be filtered out before they can be viewed in the transaction processing system. In some embodiments, this process can be implemented by screening requests for proposal after they are forwarded to the seller, but before they are presented to the seller in the transaction processing system.

In various embodiments, the requests for quote that are filtered out can be set aside for review rather than deleted. For example, they may be placed in a virtual folder that holds them until they can be reviewed. These blocked requests can be valuable to determine whether they were excluded correctly and for the demand data regarding a particular demand for a part.

It should be noted, that in some implementations, those buyers may buy from other sellers (e.g., those that are not participating in sanctions). Therefore, in such implementations, they are not blocked from the transaction processing system in its entirety (globally), but only with respect to certain sellers.

This functionality can be controlled by the transaction processor or by the seller. If implemented by the seller, the transaction processing system can place these possibly restrictable requests for quote into a holding area so that they can be vetted by a compliance officer of the seller (client) prior to passing the requests for quote on to the seller's sales team.

Further, notes about whether to accept or not accept a buyer's requests for quote can be kept in case the seller is ever audited with respect to its sales to potentially restricted buyers, in some embodiments. Notes can indicate the person doing the evaluation and can be time stamped to help in the audit process, among other useful information used for audit purposes.

The transaction processing system can establish a time period for expiration of request for quotes which can hide or delete requests that have been pending over a threshold period of time. The time period for expiration of requests can be customizable and the list of expired requests and/or the requests themselves can be held so that a manager can determine why the item became expired, but these requests can be hidden since they are no longer actionable.

As discussed above, embodiments of the present disclosure can standardize the requests for quote, making it easier for the seller (client) to process the large number of requests that are submitted to the seller (client) through the many listing service marketplaces where the seller is participating.

This can be accomplished by using software to search each request for quote for certain information and for other uses as will be described further herein. For example, the software can include executable instructions that execute to identify a part number or a domain name (based on the sender's email address) for a buyer's company, among other identifiable characteristics. These are referred to as rules. This domain name can be provided as a link to the buyer's web address, so that the seller can research the buyer. In addition to the identity of the sender and the part they are interested in, other information can be parsed from the request for quote, such as the condition of the item to be purchased and any special instructions regarding the transaction.

The transaction processing system can be trained to identify the format and location each needed item of information within each type of request for quote of a particular buyer, such as a message from a buyer through a particular listing service marketplace or other third party buyer that sends emails to the seller. Then, when a request from that listing service marketplace or other third party is identified based on learned message characteristics or pre-defined characteristics, the information can be quickly extracted.

For example, the part numbers might always be preceded with a label "pn" (e.g., Part Number). By training the search function to find codes with these characteristics, the transaction processing system can identify the part number string and use it as needed in standardizing the request for quote format or creating the quote, or for determining if an automated events such as an alarm, routing rule, and/or notification should be initiated.

Another example, is searching for names of things, like parts, companies, etc. In such searches, the system can be trained to identify certain names and those names can be mapped to a characteristic stored in the memory of the system.

For instance, the name "Avalon" could be a company name and the system could be trained to perform a function when the term Avalon is identified. This training can be accomplished by manually or automatically, via executable instructions, mapping the term Avalon to the characteristic company name.

Requests for quote with information that cannot be harvested and mapped correctly, can be set aside to determine what issues may be triggering the incomplete processing of the RFQ. It may be that a listing service marketplace or other third party has changed the format of their request for quote and that the incoming request for quote needs to be run through the training process and its content mapped to the characteristics. In this manner, the seller reviews the original message that has been set aside and maps the elements of the original message to characteristics stored in memory so that subsequent messages can be parsed quickly via the mapping that has been done in the above process.

The transaction processing system can display retrieved historical records in the ERP system via the broker application. The records can include, for example, activity of a buyer on a particular part or type of part, repair information, sales information, price information, etc. The information can come, for example, from the memory of the broker application or from the memory of the transaction data processing tool. This information can be beneficial in approving a sale or having confidence that the buyer (request provider) is known to the seller (request recipient) and may be reliable, among other benefits of such information.

The system can be customized to link a part number with the associated record in the database of the ERP such that when the part is requested, the information can be accessed and provided on the web via the client access portal. The information to be provided can also be customized. The link can be set up (mapped) by the system or by a client and once set up, the information can be accessed and provided without needing to select it each time. If the part number, for example, is not in the ERP system, it can be added, by initiating the insertions of the part record into the ERP database via the broker application.

Once the information needed is mapped to the quote creation engine (software that assists in building quotes), a quote is generated which can include, for example, a message to the buyer with an attachment (e.g., PDF) of the quote for the buyer's records. The transaction processing system can also insert the completed quote into the ERP via the broker application, if desired. This can assist in knowing which quotes have been responded to, among other benefits.

The user interface allows the client to organize requests based on the standardized data elements harvested from the Request for Quote messages. For example, the requests can be sorted by initiation date, requests that have alerts can be shown, unassigned requests that have not be assigned to a team member, expired, quoted and worked, ignored (individually) and blocked (by company) or other elements standardized by the transaction processing system. For instance, in some embodiments, such received data can be sortable by at least one category selected from the group including: initiation date, requests that have alerts, unassigned requests that have not be assigned to a team member, expired, quoted, worked, ignored, and blocked.

Additionally, embodiments can also include a management functionality that allows a manager to be able to look at all outstanding requests or select a particular team member's items to see. This includes requests that are queued for review, requests that has been handled and the details of these present and historical requests. In this manner, the manager can see what a team member has done and/or is doing and whether they are correctly handling requests and providing correct, timely quotes, among other benefits.

In various embodiments a broker application can be used to create queries that can be executed to provide information to or from the client ERP database in an orientation and format that is customized by the client. This can, for example, be accomplished through use of an application placed on a client's computing device with the application providing a portal to allow access by the client on their computing device. The web service allows a client to customize automated queries to access information within a client's ERP system on the client's computing device.

Accordingly, in the embodiments of the present disclosure data from a computerized message is located, captured, and standardized into a universal format that is principally the same text format regardless of the original sender of the message. The standardized format can be beneficial for several reasons. For example, the data can be used by third party providers for further clearance, such as a third party eCustoms software application to screen the request for proposal for potential export compliance issues. For instance, received data that has been harvested from an original message in a first text format can be modified and shown in a second text format that can be forwarded to a third party provider for export compliance clearance.

These third party applications can be integrated into the client access portal, allowing the client to quickly implement these third party functions. Alternatively, the client access portal can have software to interface with these third party applications to perform this functionality without having the third party software integrated therein.

In such an embodiment, the client access portal can also provide functionality to check ERP data via the broker application to indicate whether the seller (client) has a specified quantity of a part in stock. The request for quote can then be routed based on the inventory levels (e.g., if an item is out of stock, the captured transaction data can be directed to a team that buys inventory to sell, so that seller can satisfy the buyers request for quote.)

Another example is that the transaction data may indicate whether the transaction is a stock sale or a repair request. In such a case, the transaction data may be directed to a different team and the dynamics of the transaction may be different than if the seller where just selling a part.

As discussed herein, the transaction processing system can extract the domain name and represent it to the seller so the seller can jump straight to the buyer's website, the company name can be formatted as a link to an Internet search engine, the buyer's phone number can be linked to a communication provider, and/or email can be formatted to initiate a message to the buyer in one click on the email address. All of these features offer benefits not currently available to the seller (client) and these features all include data captured from the original message that has been rearranged and reformatted to increase the ease of use by the seller.

Another embodiment provides an online transaction processing tool that includes a computing device configured to harvest data from one or more original request for quote messages from an account of a seller, or a third party representing the seller, within an online transaction processing system, wherein the original request for quote have a number of elements arranged in a first order. The computing device is also configured to assemble a modified request for quote message for each original request for quote message wherein the modified request for quote message is a customized, uniform format and where all modified requests for quote have the same elements in the same orientation, but where the orientation of the elements is different that the original request and route the modified requests for quote to one of more team or individual computing devices at a client network. In this embodiment, the elements and their arrangement can be modified to create a new format, customized by the client that is desirable to the client.

In some embodiments, the modified message includes a link to a web address for a buyer's company based on a domain name extracted from a sender's email address. For example, the sender's email could be smith@abccompany.com and the system can identify this string of characters as an email address and strip the domain name "abccompany.com" off the email address and create a web link to the sender's website located at that domain name.

Identifying the email address can be accomplished in any suitable manner. For instance, the string could be identified by its position in the message that has, for example, been mapped by a user of the system as a location of an email, or by the item's characteristics, for example, the item having an @ symbol and a period.

In some embodiments, the modified message includes a condition of an item to be purchased. Any suitable descriptor of condition could be used to describe the condition of the item. For example, the condition could be new, used, damaged, damaged but functional, etc. This condition information could be used to provide a desired condition due, for example, to cost (used items generally are cheaper than new), or environmental consciousness (repurpose items instead of buying new) or may be a threshold level of quality (the buyer only wants functioning new or used parts, not those that could be used for salvage).

In various embodiments, the modified message includes special instructions regarding the transaction. Any suitable instructions can be provided. For example, special shipping instructions can be provided or a request to, for instance, have the seller confirm the part number with buyer prior to shipping would be suitable instructions.

Embodiments can have executable instructions to allow the transaction processing system to be trained to identify the format and location of each needed item of information within each type of request for quote of a particular buyer. As discussed herein, the training can be accomplished manually, for example, by having a user of the system map locations of items in the original message to characteristics stored in memory. For example, the domain name in an email address can be identified by a user and its position in the original message can be recorded in memory. In this manner, when the next original message is reviewed and has a similar format, the domain name from that message can automatically be process into the modified message. In some embodiments, the training can be done automatically be the system or can be done with some parts done manually and some done in an automated manner. Such training can be used to identify any element (e.g., a part number string of characters) in the original message that is of interest to the user.

This training can be done periodically or at times when it is identified that the mapping of an element has not be done yet or has been changed due to a redesign of a format of a message. For example, if the original message has information that cannot be harvested (e.g., the system reviews the format of the message and cannot find an element at a mapped location within the message that meets the element characteristics (does not have an @ symbol and a period)) and mapped correctly, the original message can be set aside to determine what issues may be triggering the incomplete processing of the original message. The message can then be used in training to map elements in the message to characteristics of interest to the user. In this process, the seller can, for example, review the original message that has been set aside and map the elements of the original message to characteristics (e.g., email address, domain name, element with an @ symbol and a period, etc.) stored in memory.

The original message can have the same, more than, or less than the original message. For example, the messages elements can simply be rearranged into a format that is easier for the seller to review, but all of the elements of the original message are present.

The seller may not wish to see certain elements (e.g., seller only sells new parts, so condition information does not matter to seller and can be excluded from the modified message). Or, as discussed herein, elements can be added to a modified message (e.g., a web link created from an email address).

In some instances, the number of elements can be the same, but the elements can be different. For example, the email address could be excluded, but the web link included.

In some embodiments, elements can be identified in the original message and used to determine whether one or more automated events should be initiated. For example, the one or more automated events include an alarm, a routing rule, a notification, or an automated response based one or more predefined conditions set by the user.

An alarm can be used, for example, to alert a team that a request for a particular element has been submitted. A routing rule a can define where the original and/or modified message is to be sent once it is created. A notification can be a message sent or saved for seller's review, such as a reminder to perform export clearance on the transaction before making the transaction.

An automated response can be defined by the seller and executable instructions can be created to automate a response when the one or more predefined conditions set by the user are present in the original message. For example, an automated rejection of the request can be sent to the buyer if a dollar amount for the purchase of an item is below a threshold amount. Additionally, provided below is example online transaction processing method. The process includes providing a broker tool in a client's computing device and establishing a new secure connection by providing a database identifier (specify the connection string) to the tool. A unique API access key is generated and the API access key is saved in the unique client account for the request provider. Then, a query to read or write data from/to a database is built and the query is executed to add, update, or remove information stored in memory. The client, then logs into the online client access portal and selects a data element from a request for quote to be displayed. The query is invoked to show requested data in the format specified by the query. In all of these examples, requests for quote are modified to achieve a uniform, customized arrangement of elements from an original request for quote format that makes it easier for the client to review and manage requests for quote, among other benefits. Provided below is further discussion that describes the attached drawings to provide more information about these concepts.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

Also, as used herein, "a" or "a number of" something can refer to one or more such things. For example, "a number of components" can refer to one or more components.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

FIG. 1 illustrates a system that provides data and executable instructions for capturing content from a client's transaction related messages from a client's account by a third party according to embodiments of the present disclosure. In FIG. 1, the illustration includes six components, however, there can be several device components that provide data necessary for capturing content from a client's transaction related messages from a client's account by a third party and those shown in FIG. 1 are merely provided to illustrate one type of system that could be utilized.

In FIG. 1, the system 100 includes a buyer's computing device 102 and a seller's computing device 104, and a seller's email computing device 101 each communicating through a respective network having one or more network devices, such as computing devices 103/105 to an online listing service marketplace computing device 108, that hosts the online listing service marketplace and the access portals to access the functions of the listing service marketplace, and the transaction processing computing device 108, which, in conjunction with the broker application device 107 installed on the seller's (client) device, provides much of the functionality described herein.

FIG. 2 illustrates a method for capturing content from a client's transaction related messages on a client's device by a third party according to one or more embodiments of the present disclosure. In some embodiments, a method can include harvesting data from one or more original messages from an account of a seller within seller's email, wherein the original message has a number of elements arranged in a first order, as shown at 212 of FIG. 2.

At 213, the method includes: assembling a modified message for each original message wherein the modified message is a customized, uniform format and where all modified messages each have the same elements in the same orientation, but where the orientation of the elements is different than that of the original message. The method further includes routing the modified messages to one of more team or individual accounts on the client portal access on the client computing devices at a client network, at 214.

Figure 3:
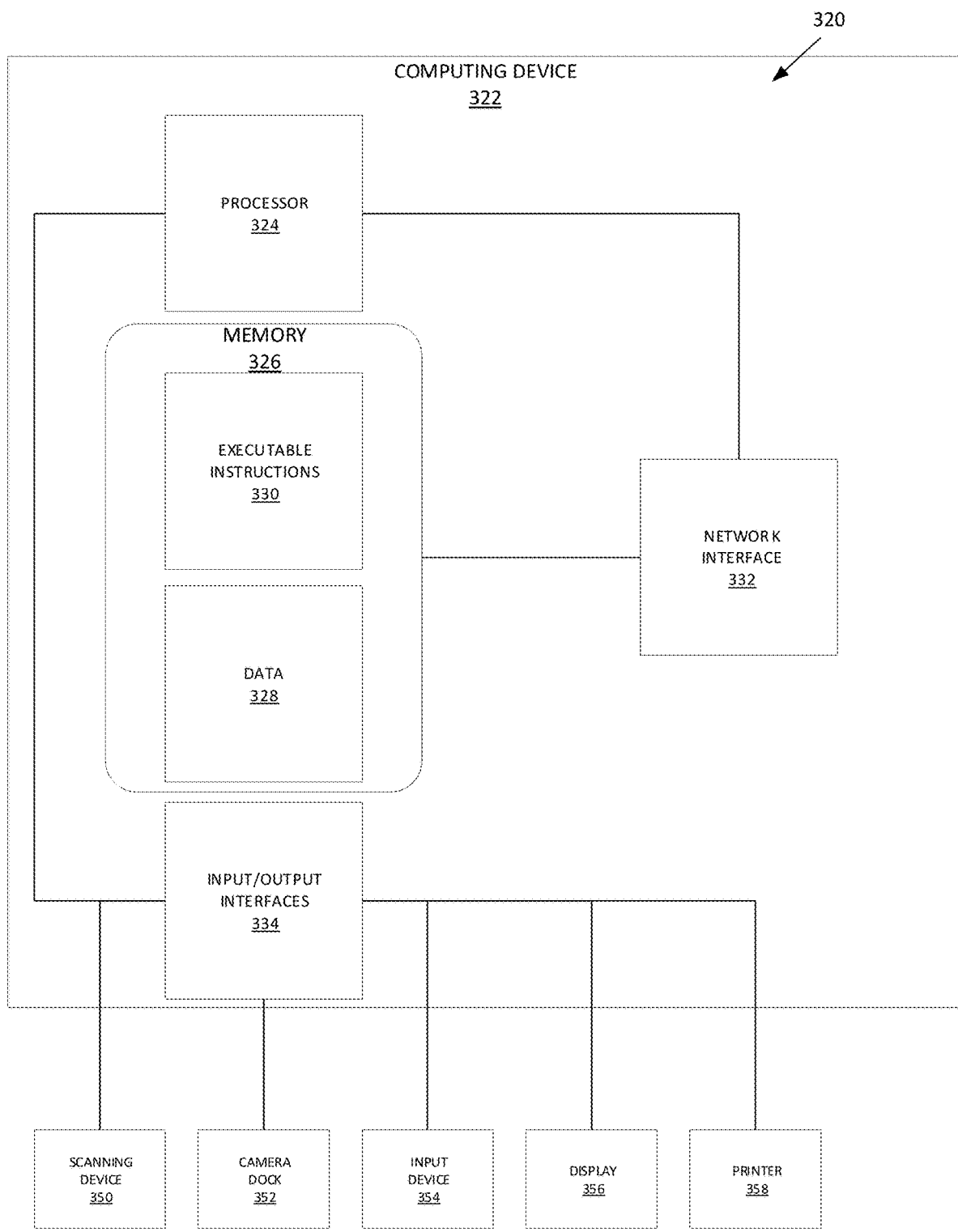
FIG. 3 illustrates a computing device system for capturing content from a client's transaction related messages on a client's device by a third party according to one or more embodiments of the present disclosure.

FIG. 3 illustrates a system for capturing content from a client's transaction related messages in a client's email computing device by a third party according to one or more embodiments of the present disclosure. In the system illustrated in FIG. 3, the system 320 includes a computing device 322 (can be any of the devices shown in FIG. 1, with functions provided by this device to accomplish the tasks of such a device) having a number of components coupled thereto. The computing device 322 includes a processor 324 and memory 326. The memory 326 can include various types of information including data 328 and executable instructions 330 discussed herein.

Memory and/or the processor may be located on the computing device 322 or off the device in some embodiments. As such, as illustrated in the embodiment of FIG. 3, a system can include a network interface 332. Such an interface can allow for processing on another networked computing device or such devices can be used to obtain information about the buyer, the part, or executable instructions for use with various embodiments provided herein.

As illustrated in the embodiment of FIG. 3, a system can include one or more input and/or output interfaces 334. Such interfaces can be used to connect the computing device with one or more input or output devices. These devices can be used to receive or access data that can be used to accomplish the functions described herein.

For example, in the embodiment illustrated in FIG. 3, the system 320 can include connectivity to a scanning device 350, a camera dock 352, an input device 354 (e.g., a keyboard, mouse, etc.), a display device 356 (e.g., a monitor), a printer 358, and one or more other input devices. The input/output interface 334 can receive data, storable in the data storage device (e.g., memory 326), for example, representing the part number, quantity information, buyer's contact information and/or request details, among other information.

In some embodiments, the scanning device 350 can be configured to scan one or more documents containing information pertaining to the quote process, such as written notes about the transaction or buyer, government watch list information, or other documents utilized in the process. For example, the scanning device 350 can be configured to input data to one or more application modules.

The camera dock 352 can receive an input from an imaging device (e.g., a two-dimensional imaging device) such as a digital camera or a printed photograph scanner. The input from the imaging device can be stored in the data storage device (e.g., memory 326).

The processor 324 can be configured to execute instructions stored in memory to evaluate the request for quote, analyze data regarding determining whether a quote should be sent to the buyer, create the quote, and/or provide the functionalities described herein, and can provide those details to a display 356 (e.g., on a GUI running on the processor 324 and visible on the display 356). Input received, for example, from the seller or manager via the GUI can be sent to the processor 324 as data and/or can be stored in memory 326.

Such connectivity can allow for the input and/or output of data and/or instructions among other types of information. Although some embodiments may be distributed among various computing devices within one or more networks, such systems as illustrated in FIG. 3 can be beneficial in allowing for the capture, calculation, and/or analysis of information discussed herein.

Figure 4:
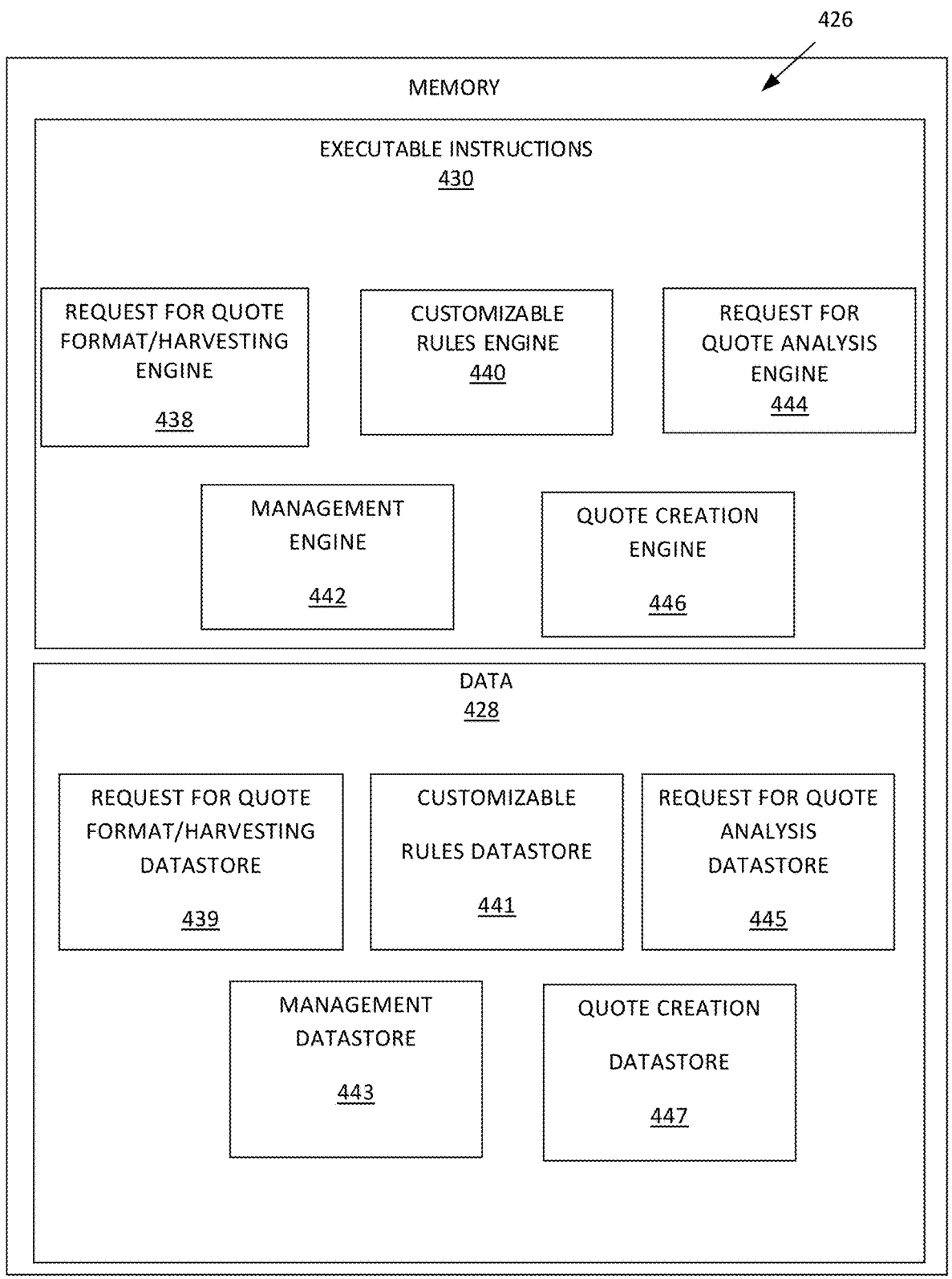
FIG. 4 illustrates sets of executable instructions and data that can be used to provide the functionalities according to one or more embodiments of the present disclosure.

FIG. 4 illustrates sets of executable instructions and data that can be used to provide the functionalities according to one or more embodiments of the present disclosure. In FIG. 4, a number of sets of executable instructions, referred to herein as engines, are used to accomplish the various functionalities of embodiments of the present disclosure. This is accomplished by a processor (e.g., processor 324) executing these instructions in association with data in a data storage device (e.g., memory 326) in memory 426.

The sets of instructions 430 can be grouped (referred to herein as engines) into functionalities that they provide to the system, such as a request for quote format/harvesting engine 438, a customizable rules engine 440, a management engine 442, a request for quote analysis engine 444, and a quote creation engine 446. These sets of instructions use data to make determinations and provide functions that benefit the system.

The request for quote format/harvest engine 438 reviews requests for quote from different listing service marketplaces to determine the format of a request for quote for a particular marketplace and saves that information in memory. This information is useful to determine the uniform format to use for all requests for quote and for mapping the elements of the request for quote to the characteristics stored in memory, among other uses.

The customizable rules engine 440 can be used to determine the alert or notification type to be set, the timing of when and alert or notification is actuated, the criteria for initiating an alarm or notification, who to route the request for quote to within the client organization and other alarms, notifications, or functions. This engine uses data taken from the request for quote and from data about client preferences to determine any alerts/routes/notifications to be utilized.

The management engine 442 allows the manager at the seller (client), or other supervisory person to access the capabilities and views on the display device in a similar manner to a sales team member. In this manner, the manager can look at statistical data regarding sales and individual sales personnel, a salesperson's historical sales, notes on a sale, process transaction on behalf of the team member and other suitable managerial functions.

The request for quote analysis engine 446 determines whether or not the seller should send a quote to the buyer. The functions of this engine will likely be used in conjunction with sales member feedback from an input device to make the determination. The data to be used by these engines can be stored in memory, as is discussed in more detail below.

The quote creation engine 444 can be used to create a quote to be sent to a buyer that has met the criteria for a sale of the part. The creation engine takes information about the part and seller information, either stored in memory or input by a sales member, to create a quote to send back to the buyer.

For example, such data 428 can include request for quote format/harvest data in datastore 439, customizable rule data in datastore 441, management data in datastore 443, request for quote analysis in datastore 445, and quote creation data in datastore 447.

Provided below are some example embodiments. The elements and limitations of these embodiments shall be viewed as only examples of elements and limitations that embodiments can possess.

In one transaction data processing tool embodiment, the tool includes an application for placement on a client's computing device. The application has a portal to allow access between the client's computing device and a transaction processing computing device, wherein the web service allows a client to customize automated queries to read or write information to a client's ERP database on the client's computing device and storing the customized automated queries in memory and allowing the transaction processing device to read or write the information to or from the client's ERP database via the customized queries stored in memory on the client's computing device for purpose of display of ERP data on the client portal and writing data generated on the client portal back to the ERP database.

In another transaction data processing tool embodiment, the tool includes a computing device configured to harvest data from one or more original messages from an account of a seller within seller's email on the computing device, wherein the original message has a number of elements arranged in a first order. The computing device is also configured to assemble a modified message for each original message wherein the modified message is a customized, uniform format and where all modified messages each have the same elements in the same orientation, but where the orientation of the elements is different than that of the original message. The modified messages can then be routed to one of more team or individual accounts on the client portal access on the client computing devices at a client network.

Another example provides a transaction data processing method including providing a transaction data processing tool in a client's computing device on client's local network. This tool can interface with the client's ERP data and can convert message content from a first text format to a second message format.

This example method also includes establishing a new secure connection from a device outside the client's local network to an application inside the client's network and by providing a database connection to a client ERP database. This allows data stored in the client's ERP system to be utilized by the device outside the client's local network.

This method further includes building a query by selecting at least one of each from a plurality of actions and a plurality of subject matter choices. As described herein, the actions can be alarms, notifications, initiating third party functionality, such as export control or other suitable functions.

The example method also can utilize an API access key. For example, the method generates a unique API access key and saves the API access key in a unique client account for a particular request provider.

Further, the method retrieves data having a first text format from a database and executes the query to add or update the text format of the retrieved data to a second text format. Once this modified formatting is complete, the method logs into client access portal and selects a data element to display relevant data for invoking the query to show the retrieved data in the second text format specified by the query. In this manner, the query can be invoked to show the retrieved data in the second text format specified by the query. wherein received data shown in the second text format is sortable by at least one category selected from the group including: initiation date, requests that have alerts, unassigned requests that have not been assigned to a team member, expired, quoted, worked, ignored, and blocked.

In this manner, a user can define the second text format that information presented in a first text format can be presented and/or utilized. This can be beneficial for the reasons discussed herein.

Further, in some embodiments, a method can include harvesting data having a first characteristic from an original message having the first text format from an account of a seller within seller's email on the computing device and saving the harvested data in a memory location associated with the first characteristic. In various embodiments, a method such as this can include utilizing a quote creation engine that accesses harvested data stored in memory and creates a quote to be sent to a buyer.

As discussed above, the methods, devices, and systems for facilitating request for quote handling with an online transaction processing system disclosed herein can provide many benefits. The benefits assistance in organizing and managing the request for quote process and the management of employees handling such transactions.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A transaction data processing system, comprising;
    a third party computing device, that facilitates the organization of harvested data received by a seller from a prospective buyer through a marketplace provided by the third party computing device, the marketplace having a plurality of seller access portals each for a different seller and a plurality of prospective buyer access portals each for a different buyer, wherein the third party is neither one of the sellers nor the buyers, the third party computing device configured to:
    harvest data, the data received by and stored in a seller's computing device within a secured local network and harvested by a harvesting application located outside of the local network, wherein the seller has granted access to the local network by the harvesting application to harvest the data, the harvested data being from one or more original prospective buyer messages from an account of a seller within seller's email received by the third party computing device, wherein the original message from a prospective buyer has a number of transaction elements arranged in a first order;
    assemble, via the third party device, a modified message for each original prospective buyer message wherein the modified message is a customized, uniform format and where all modified messages each have the same elements in the same orientation, but where the orientation of the elements is different than that of the original prospective buyer message, the uniform format being customized by the seller by selecting particular transaction elements from the number of transaction elements and arranging them in an order defined by the seller so that the information is presented in a manner that includes a seller's preferences on content of information presented and arrangement of the presentation of the content; and route the modified message on the third party computing device to one or more team or individual accounts on the seller access portal provided by the third party computing device.

2. The transaction data processing system of claim 1, wherein the modified message includes a link to a web address for a buyer's company based on a domain name extracted from a sender's email address.

3. The transaction data processing system of claim 1, wherein the modified message includes a condition of an item to be purchased.

4. The transaction data processing system of claim 1, wherein the modified message includes special instructions regarding the transaction.

5. The transaction data processing system of claim 1, wherein the transaction processing system is trained to identify the format and location of each needed item of information within each type of request for quote of a particular buyer.

6. The transaction data processing system of claim 1, wherein the computing device identifies the part number string within an original received message.

7. The transaction data processing system of claim 1, wherein the modified message has less elements than the original message.

8. The transaction data processing system of claim 1, wherein the number of elements are identified in the original message and used to determine whether one or more automated events should be initiated.

9. The transaction data processing system of claim 1, wherein the one or more automated events include an alarm, a routing rule, a notification, or an automated response based on one or more predefined conditions set by the user.

10. The transaction data processing system of claim 1, wherein a company name identified in the original message is mapped to a characteristic company name stored in memory.

11. The transaction data processing system of claim 1, wherein if the original message has information that cannot be harvested and mapped correctly, the original message is set aside to determine what issues may be triggering the incomplete processing of the original message.

12. The transaction data processing system of claim 11, wherein the seller reviews the original message that has been set aside and maps the elements of the original message to characteristics stored in memory.

13. The transaction data processing system of claim 1, wherein the tool displays retrieved historical records including at least one of: activity of a buyer on a particular part, activity of a buyer on a type of part, repair information, sales information, and price information.

14. A transaction data processing method, comprising:
establishing a new secure connection to a third party computing device outside the client's secured local network, from a third party application located on a client's local network computing device inside the client's local network and by providing a database connection, by the third party computing device, to a client ERP database, the third party computing device facilitates the organization of harvested data, the data received by and stored in a client's computing device within the secured local network and harvested by a harvesting application located outside of the local network, wherein the client has granted access to the local network by the harvesting application to harvest the data, the harvested data being received by a client from a second party through a marketplace provided by the third party computing device, the marketplace having a plurality of client access portals each for a different client and a plurality of second party access portals each for a different second party, wherein the third party is neither one of the clients nor the second parties;

building a query by selecting at least one of each from a plurality of actions and a plurality of subject matter choices by:
retrieving data having a first format of transaction message elements from a database;
executing the query to add or update the first format of transaction message elements of the retrieved data to a second text format;
logging into client access portal provided by the third party computing device; and
selecting, via the local network computing device, a data element to display relevant data for invoking the query to show the retrieved data in the second format of transaction message specified by the query.

15. The transaction data processing method of claim 14, wherein the method includes harvesting data having a first characteristic from an original message having the first format from an account of a seller within seller's email on the computing device and saving the harvested data in a memory location associated with the first characteristic.

16. The transaction data processing method of claim 14, further comprising utilizing a quote creation engine that accesses harvested data stored in memory and creates a quote to be sent to a buyer.

17. The transaction data processing method of claim 14, wherein received data shown in the second format is sortable by at least one category selected from the group including: initiation date, requests that have alerts, unassigned requests that have not be assigned to a team member, expired, quoted, worked, ignored, and blocked.

18. The transaction data processing method of claim 14, wherein received data shown in the second format is forwarded to a third party provider for further clearance.

19. The transaction data processing method of claim 18, wherein received data shown in the second format is forwarded to a third party provider for export compliance clearance.

20. A transaction data processing tool, comprising:
a third party harvesting application for placement on a client's computing device within a local network wherein the third party application allows access into the client's computing device by a third party computing device and a transaction processing computing device outside of the client's local network, the transaction processing computing device facilitates the organization of harvested data, the data received by and stored in a seller's computing device within a secured local network and harvested by the third party harvesting application located outside of the local network, wherein the seller has granted access to the local network by the harvesting application to harvest the data, the harvested data being received by a client from a second party through a third party provided marketplace provided by the web service of the transaction processing computing device, the third party provided marketplace having a plurality of client access portals each for a different client and a plurality of second party access portals each for a different second party, wherein the third party is neither one of the clients nor the second parties, wherein the access by the third party computing device and transaction processing computing device allows a client to customize automated queries to read or write information to a client's ERP database on the client's computing device and stores the customized automated queries in memory and allow the transaction processing device to read or write the information to or from the client's ERP database via the customized queries stored in memory on the client's computing device for purpose of display of ERP data on a client portal and writing data generated on the client portal back to the ERP database.

* * * * *